(12) United States Patent
Son et al.

(10) Patent No.: US 8,502,904 B2
(45) Date of Patent: Aug. 6, 2013

(54) DIGITAL PHOTOGRAPHIC APPARATUS AND METHOD FOR CONTROLLING THE SAME THAT PROVIDE VISION CORRECTION

(75) Inventors: Sang-ryoon Son, Suwon-si (KR);
Hyun-sik Yu, Suwon-si (KR);
Byeong-chan Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 633 days.

(21) Appl. No.: 12/620,705

(22) Filed: Nov. 18, 2009

(65) Prior Publication Data
US 2010/0157109 A1 Jun. 24, 2010

(30) Foreign Application Priority Data
Dec. 23, 2008 (KR) .................... 10-2008-0132521

(51) Int. Cl.
*H04N 5/222* (2006.01)
*G03B 13/02* (2006.01)

(52) U.S. Cl.
USPC .............. 348/333.12; 348/222.1; 348/333.01; 351/200

(58) Field of Classification Search
None
See application file for complete search history.

(56) References Cited

U.S. PATENT DOCUMENTS

| 6,516,154 B1* | 2/2003 | Parulski et al. | 396/287 |
| 2002/0039491 A1* | 4/2002 | Nanjo et al. | 396/374 |
| 2003/0189661 A1* | 10/2003 | Flach et al. | 348/333.09 |
| 2004/0202381 A1* | 10/2004 | Kitajima | 382/275 |
| 2008/0212195 A1* | 9/2008 | Yamamoto | 359/630 |
| 2010/0104272 A1* | 4/2010 | Ogino et al. | 396/374 |

FOREIGN PATENT DOCUMENTS
KR 1020010109386 A 12/2001

* cited by examiner

*Primary Examiner* — John Villecco
*Assistant Examiner* — Dwight C Tejano
(74) *Attorney, Agent, or Firm* — Drinker Biddle & Reath LLP (57) ABSTRACT

Provided are a digital photographing apparatus which provides the benefit of distorting an image of an object display on an electronic viewfinder so that the object does not appear to be distorted to a user with astigmatism, and a method of controlling the digital photographing apparatus. The digital photographing apparatus includes an image capture device configured to generate data from light incident to an object to generate preview images of the object; and an electronic viewfinder configured to display preview images, wherein the digital photographing apparatus is configured to distort the preview image to correct for the vision of a user and to control the electronic viewfinder to display the distorted preview image.

13 Claims, 8 Drawing Sheets

DIGITAL PHOTOGRAPHIC APPARATUS AND METHOD FOR CONTROLLING THE SAME THAT PROVIDE VISION CORRECTION

CROSS-REFERENCE TO RELATED PATENT APPLICATION

This application claims the benefit of Korean Patent Application No. 10-2008-0132521, filed on Dec. 23, 2008 in the Korean Intellectual Property Office, the entire contents of which is incorporated herein by reference.

BACKGROUND OF THE INVENTION

1. Field of the Invention

The present invention relates to a digital photographing apparatus and a method of controlling the same. More particularly, the present invention relates to a digital photographing apparatus including an electronic viewfinder that enables a user with astigmatism to perceive the actual shape of an object displayed as a preview image when using the digital photographing apparatus, and a method of controlling the digital photographing apparatus.

2. Description of the Related Art

In general, in a preview mode, digital photographing apparatuses display a preview image, which may be a real-time moving picture, on a display unit to allow a user to select a shooting composition. The digital photographing apparatus stores still image data in a storage medium in response to a signal from the user and, in a playback mode, may display a still image corresponding to the still image data that are stored in the storage medium on the display unit.

Recently, available digital photographing apparatuses include an electronic viewfinder which may display a preview image on the electronic viewfinder so that the user can select a shooting composition by viewing the preview image being displayed on the electronic viewfinder. However, if a user has an astigmatism and takes off their corrective glasses to use the electronic viewfinder, the user cannot accurately perceive an image being displayed. Thus, a captured image may differ from the image the user intended to shoot.

SUMMARY OF THE INVENTION

A digital photographing apparatus is disclosed. The digital photographing apparatus is disclosed includes an image capture device configured to generate data from light incident to an object to generate preview images of the object; and an electronic viewfinder configured to display preview images, wherein the digital photographing apparatus is configured to distort the preview image to correct for the vision of a user and to control the electronic viewfinder to display the distorted preview image.

The digital photographing apparatus may distort the preview image in a preset manner according to the vision of the user.

The digital photographing apparatus may include an information storage unit that stores vision information of the user, wherein the digital photographing apparatus distorts the preview image based on the stored vision information of the user.

The vision information of the user may be at least one of: astigmatism information and astigmatism correction information.

The digital photographing apparatus may be configured to present an interface to the user and receive from the user at least one of: astigmatism information or astigmatism correction information.

The digital photographing apparatus may be configured to: capture a first image without a pair of corrective glasses of the user and a second image with a pair of corrective glasses of the user, and to calculate corrective information for the user based on the difference between the first image and the second image.

The digital photographing apparatus may be further configured to distort the preview image in a way opposite to the way in which a user with astigmatism perceives an image as being distorted.

The digital photographing apparatus may include a rotation sensor configured to sense a rotation of the digital photographing apparatus generate signals indicating the rotation; and wherein the digital photographing apparatus is further configured to distort the preview image in consideration of whether the digital photographing apparatus is rotated or not based on the signals generated by the rotation sensor.

A method of controlling a digital photographing apparatus is disclosed. The method of controlling a digital photographing apparatus may include generating a preview image from light incident to an object; distorting the preview image to correct for the vision of a user; and displaying the distorted preview image to the user.

The method may include retrieving correction information for the vision of the user; and wherein distorting further comprises: distorting the preview image using the correction information to correct for the vision of a user.

The correction information may include at least one of: astigmatism information of the vision of the user or astigmatism correction information of the vision of the user.

The method may further include displaying a standard image; responsive to user input to distort the standard image, distorting the standard image and displaying the distorted standard image; calculating corrective information for the user based on a difference between the standard image and the distorted standard image; and storing the corrective information.

The method may further include capturing a first image; capturing a second image with the user's corrective glasses positioned in front of a lens of the digital photographing apparatus; calculating corrective information for the user based on a difference between the first image and the second image; and storing the corrective information.

Distorting may further include distorting the preview image using the correction information to correct for the vision of a user in a way opposite to the way in which a user with astigmatism perceives an image as being distorted.

The method may further include distorting the preview image to correct for the vision of a user and distorting the preview image based on rotational sensor information, the rotational sensor information indicating whether the digital photographing apparatus is rotated or not.

A method of controlling a digital photographing apparatus is disclosed. The digital photographing apparatus may include an electronic viewfinder that displays an image corresponding to data generated by an image capture device. The method may include: (a) acquiring a first image by shooting an object with a pair of user's glasses being positioned in front of a lens of the digital photographing apparatus; (b) acquiring a second image by shooting the object without positioning the pair of user's glasses in front of the lens of the digital photographing apparatus; and (c) acquiring at least one of astigmatism information or astigmatism correction information based on a difference between the first image and the second image.

The method may further include when a preview image corresponding to preview image data generated by the image capture device is displayed, the electronic viewfinder distorts the preview image corresponding to the preview image data generated by the image capture device, based on the astigmatism information or astigmatism correction information acquired in the act of (c), and displays the distorted preview image.

BRIEF DESCRIPTION OF THE DRAWINGS

The above and other features and advantages of the present disclosure will become more apparent by describing in detail exemplary embodiments thereof with reference to the attached drawings in which.

DETAILED DESCRIPTION OF THE INVENTION

Therefore, there is a need in the art for a digital photographing apparatus including an image capture device configured to generate data from light incident to an object to generate preview images of the object; and an electronic viewfinder configured to display preview images, wherein the digital photographing apparatus is configured to distort the preview image to correct for the vision of a user and to control the electronic viewfinder to display the distorted preview image. The digital photographing apparatus provides the benefit of distorting an image of an object displayed on an electronic viewfinder so that the object does not appear to be distorted to a user with astigmatism.

Hereinafter, exemplary embodiments of the disclosure will be described in detail with reference to the appended drawings.

Figure 1:
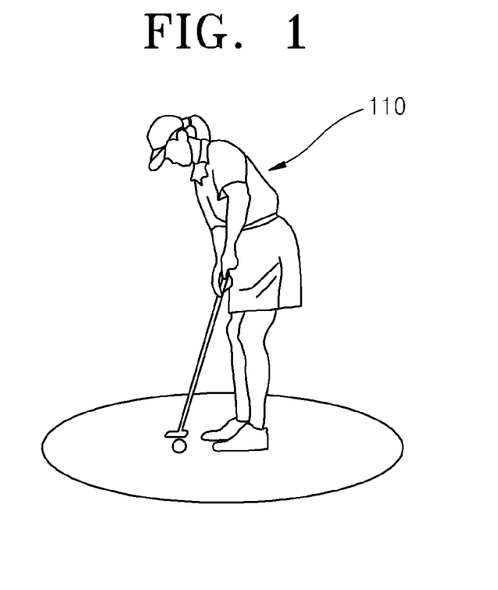
FIG. 1 is an example of a schematic view of an object.
Figure 2:
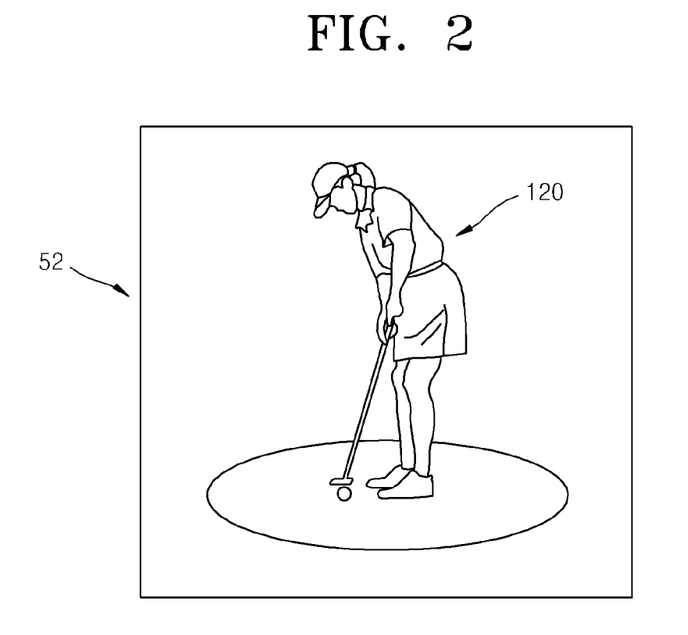
FIG. 2 is a schematic diagram illustrating an example of a preview image displayed on an electronic viewfinder.
Figure 3:
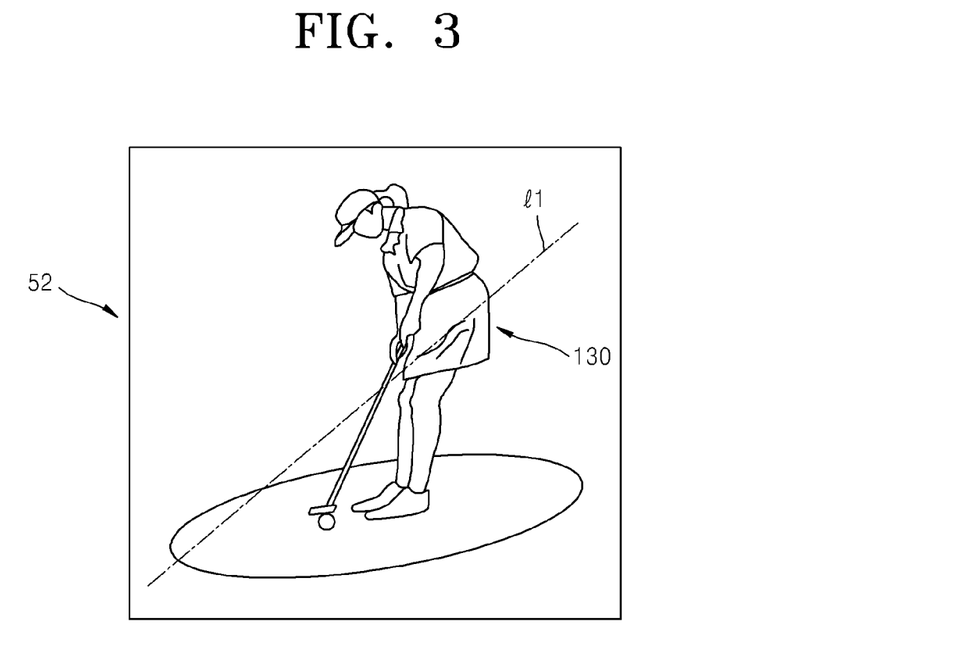
FIG. 3 is an example of a schematic view illustrating an image of the preview image of FIG. 2 as FIG. 2 would be perceived by a user with an astigmatism not wearing corrective glasses.

FIG. 1 is an example of a schematic view of an object 110. FIG. 2 is a schematic diagram illustrating a preview image 120 displayed on an electronic viewfinder 52 of the object 110. The image 120 of the object 110 of FIG. 1 has been captured by a digital photographing apparatus 300 (see FIG. 7) and displayed on the electronic viewfinder 52. Even though FIG. 2 illustrates an accurate preview image 120 of the object 110 illustrated in FIG. 1, some users may perceive the preview image as being distorted. For example, FIG. 3 is a schematic view of an image 130 illustrating how the image 120 of FIG. 2 would be perceived by a user with an astigmatism not wearing corrective glasses. As is evident from a comparison of image 130 of FIG. 3 with image 120 of FIG. 2, the user with an astigmatism may perceive the image 120 of FIG. 2 as being the distorted image 130 of FIG. 3. This may make it difficult for the user to use the digital photographing apparatus 300. This problem may be made worse because often users who wear corrective glasses prefer to take the corrective glasses off when viewing the electronic viewfinder 52.

Figure 4:
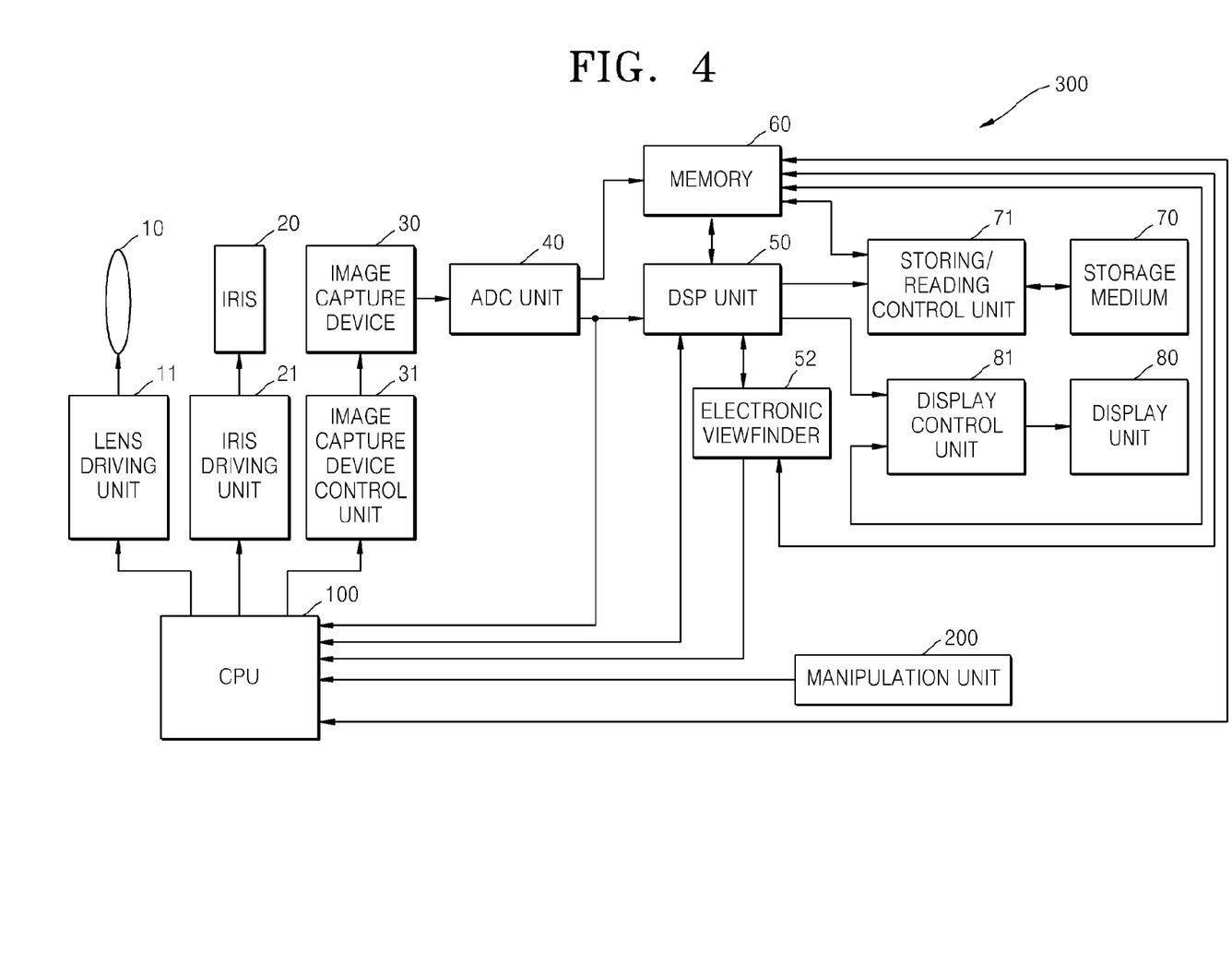
FIG. 4 is a block diagram of an example of a digital photographing apparatus according to an embodiment of the present invention.

FIG. 4 is a block diagram of a digital photographing apparatus 300 according to an embodiment of the present disclosure.

All operations of the digital photographing apparatus 300 are controlled by a central processing unit (CPU) 100. The digital photographing apparatus 300 includes a manipulation unit 200 having a key generating an electrical signal in response to a user's instruction. An electrical signal generated by the manipulation unit 200 is transmitted to the CPU 100 so that the CPU 100 can control the digital photographing apparatus 300 according to the electrical signal.

In a preview mode, the CPU 100 controls a lens driving unit 11, an iris driving unit 21, and an image capture device control unit 31, thus controlling the position of a lens 10, the degree of openness of an iris 20, and the sensitivity of an image capture device 30. The CPU 100 may perform the control operations in response to an electrical signal received from the user. Alternatively, the CPU 100 may automatically perform the control operations. The control operations may be performed in various forms. The location of the lens 10, the degree of openness of the iris 20, and the sensitivity of the image capture device 30 may be controlled simultaneously or individually.

The image capture device 30 generates image data from incident light. An analog/digital converting (ADC) unit 40 converts analog data output from the image capture device 30 into digital data. The ADC unit 40 may be included or not depending on the characteristics of the image capture device 30.

Data output from the image capture device 30 may be provided to a digital signal processing (DSP) unit 50 via a memory 60 or directly, bypassing the memory 60. The data output from the image capture device 30 may also be provided to the CPU 100 if necessary. In the present embodiment, the memory 60 may include a read-only memory (ROM) or a random access memory (RAM). The DSP unit 50 can perform digital signal processing, such as gamma correction, white balance correction, and the like, if needed. However, the DSP unit 50 may intentionally distort a preview image corresponding to preview image data generated in the image capture device 30, which will be described later. A preview image corresponding to the preview image data generated in the image capture device 30 may be distorted in various manners, for example, by another internal element or an external element, instead of the DSP unit 50. For convenience, only the case of using the DSP unit 50 to distort a preview image corresponding to the preview image data generated in the image capture device will be described later.

Data output from the DSP unit 50 may be transmitted to a display control unit 81 directly or via the memory 60. The display control unit 81 controls a display unit 80 to display an image corresponding to the data on the display unit 80. When the image capture device 30 generates still image data in response to a shooting signal received from the user, the data output from the DSP unit 50 may be input to a storing/reading control unit 71 directly or via the memory 60. In this case, the storing/reading control unit 71 may store the data in a storage medium 70 in response to a signal received from the user or may store the data automatically. In a playback mode, the storing/reading control unit 71 may read data on a still image from a file stored in the storage medium 70, and may input the data to the display control unit 81 through the memory 60 or via another path so as to display the still image on the display unit 80. The storage medium 70 may be attachable to and detachable from the digital photographing apparatus 300. Alternatively, the storage medium 70 may be permanently built in the digital photographing apparatus 300. The preview image data output from the DSP unit 50 may be transmitted to an electronic viewfinder 52 directly or via the memory 60. The electronic viewfinder 52 may display the preview image corresponding to the preview image data. In embodiments, the functionality of the electronic viewfinder 52 and the display unit 80 may be the same so that there is only one device which displays images such as the preview image data and the still images and/or moving images.

Figure 5:
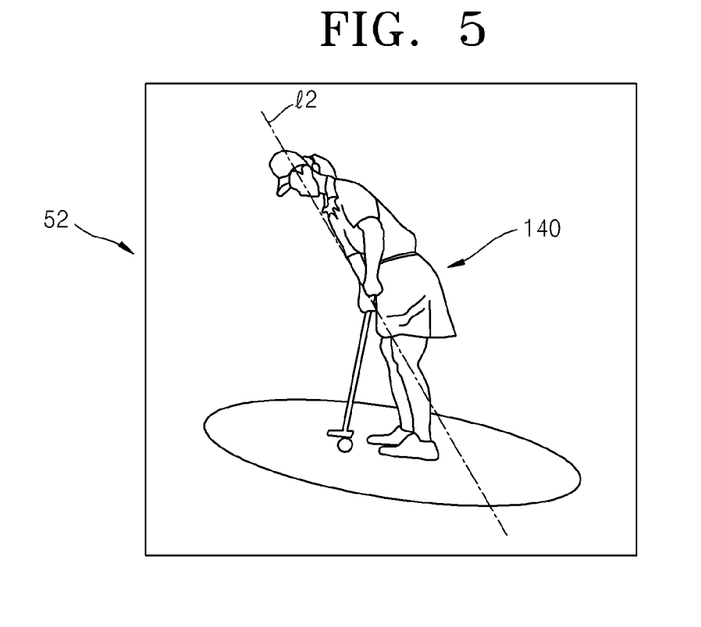
FIG. 5 is a schematic diagram illustrating of an example of a preview image displayed on an electronic viewfinder in the digital photographing apparatus of FIG. 4.
Figure 6:
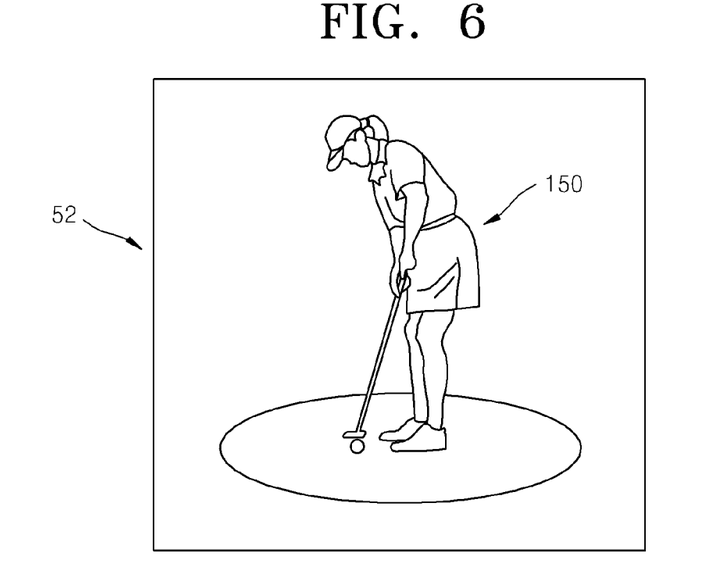
FIG. 6 is a schematic view illustrating an example of an image of the preview image of FIG. 5 as FIG. 5 would be perceived by a user with astigmatism.

FIG. 5 is a schematic diagram illustrating a preview image displayed on the electronic viewfinder 52 in the digital photographing apparatus 300 of FIG. 4. FIG. 6 is a schematic view illustrating an image corresponding to the preview image of FIG. 5 perceived by an astigmatic user.

As described above, even when an accurate preview image 120 (FIG. 2) of the object 110 as illustrated in FIG. 1 is displayed on the electronic viewfinder 52, as illustrated in FIG. 2, the preview image 130 (FIG. 3) displayed on the electronic viewfinder 52 may be perceived as being distorted, as illustrated in FIG. 3, by a user with astigmatism when the user is not wearing anastigmatic glasses. To assist the user with the astigmatism the digital photographing apparatus 300 may distort the image 120 (FIG. 2) and then display the distorted image 140 (FIG. 5) as illustrated in FIG. 5. The user with astigmatism without corrective glasses perceives the distorted image 140 of FIG. 5 as being the undistorted image 150 of FIG. 6. Consequently, the user with astigmatism perceives the distorted preview image 140 of FIG. 5 as an image 150 (FIG. 6) that is similar to the original object 110 (FIG. 1) Thus, the user may obtain a final shot image according to an intended shooting composition.

The digital photographing apparatus 300 may distort the preview image 120 (of FIG. 2) corresponding to the preview image data generated by the image capture device 30 in a preset manner and may display the distorted preview image 140 (of FIG. 5). An image distortion pattern caused by astigmatism may differ for different people with astigmatism. Thus, the digital photographing apparatus 300 needs to distort the preview image 120 (of FIG. 2) corresponding to the preview image data generated by the image capture device 30 in consideration of an image distortion pattern of a particular user's astigmatism.

For example, when the preview image 120 of FIG. 2 is perceived as being distorted along line $l_1$, as illustrated in FIG. 3, by the user, the preview image may be distorted along line $l_2$, which is substantially perpendicular to line $l_1$, as illustrated in FIG. 5, and may then be displayed on the electronic viewfinder 52. The distorted preview image 140 of FIG. 5 is perceived as being the preview image 150 of FIG. 6, which is similar to the original object 110 of FIG. 1, by the user with astigmatism, who perceives the original preview image 120 of FIG. 2 as a distorted image 130 as illustrated in FIG. 3. The digital photographing apparatus 300 according to the present embodiment may distort a preview image corresponding to the preview image data generated by the image capture device 30 in a way opposite to the way in which the user with astigmatism perceives the original preview image distorted so that the user may perceive the image as not being distorted.

For a user who may perceive the preview image 120 of FIG. 2 distorted along line $l_2$, as illustrated in FIG. 5, the preview image 120 may be distorted along line $l_1$ as illustrated in FIG. 3, which is substantially perpendicular to line $l_2$, and may then be displayed on the electronic viewfinder 52. The distorted preview image of FIG. 3 may be perceived as being the preview image of FIG. 6, which is similar to the original object, by the user with astigmatism, who perceives the original preview image of FIG. 2 as being distorted as illustrated in FIG. 6.

Figure 7:
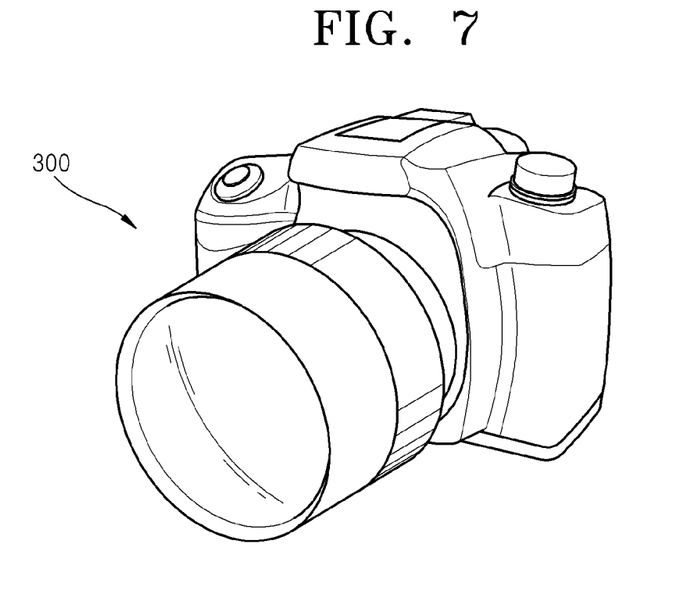
FIGS. 7 and 8 are schematic diagrams illustrating an example of rotation of the digital photographing apparatus in a shooting mode.
Figure 8:
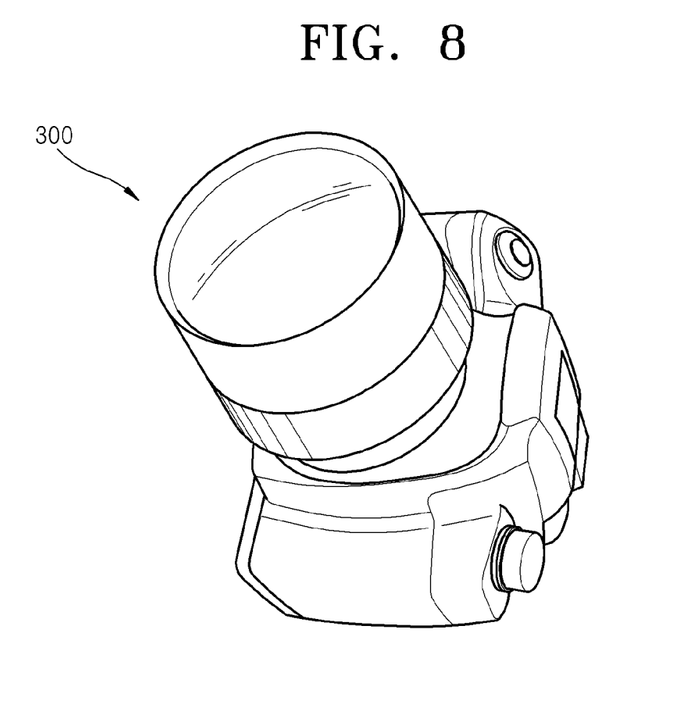

When shooting using the digital photographing apparatus 300, the digital photographing apparatus 300 may be rotated, as illustrated in FIGS. 7 and 8, during shooting. As the digital photographing apparatus 300 is rotated, the electronic viewfinder 52 is rotated. In this case, the way in which the electronic viewfinder 52 distorts and displays the preview image may be varied.

For example, when the digital photographing apparatus 300 shoots an image in a state as illustrated in FIG. 7, the digital photographing apparatus 300 may distort the preview image in left and right directions and may then display the distorted preview image. When the digital photographing apparatus 300 shoots an image in a state as illustrated in FIG. 8, the digital photographing apparatus 300 may distort the preview image in left and right directions and may display the distorted preview image. Herein, the term "left and right directions" means the left and right directions with respect to the view of the user with astigmatism, not with respect to the digital photographing apparatus. In other words, considering the direction in view of the electronic viewfinder 52 of the digital photographing apparatus 300, the direction in which the digital photographing apparatus 300 distorts the preview image when the digital photographing apparatus 300 is in the state as illustrated in FIG. 7 is perpendicular to the direction in which the digital photographing apparatus 300 distorts the preview image when the digital photographing apparatus 300 is in the state as illustrated in FIG. 8.

To this end, the digital photographing apparatus 300 according to the present embodiment may further include a rotation sensor sensing the rotation of the digital photographing apparatus and configured to generate signals indicating the rotation of the digital photographing apparatus. In this case, the digital photographing apparatus 300 may distort a preview image corresponding to the preview image data generated by the image capture device 30 in consideration of the rotation of the digital photographing apparatus 300, which is sensed by the rotation sensor, and may then display the distorted preview image.

In addition, the digital photographing apparatus 300 according to the present embodiment may further include an information storage unit storing astigmatism information or astigmatism correction information. In this case, the digital photographing apparatus 300 may distort a preview image corresponding to the preview image data generated by the image capture device 30 based on the astigmatism information or the astigmatism correction information stored in the information storage unit and may then display the distorted preview image. The information storage unit may be part of the memory 60 in FIG. 4 or may be a separate element.

The astigmatism information or the astigmatism correction information stored in the information storage unit may be directly input by the user or may be created based on information input by the user. For example, a user with astigmatism normally wears a pair of anastigmatic glasses and the user may be aware of their astigmatism information when purchasing the pair of anastigmatic glasses, which has an anastigmatic function. Thus, the digital photographing apparatus may present a user interface for the user to input the astigmatism information. The digital photographing apparatus according to the present embodiment may store the astigmatism information in the information storage unit.

Herein, assuming that the astigmatism information is expressed as a function f(x), the astigmatism correction information may be expressed as $f^{-1}(x)$, which is an inverse function of f(x).

Figure 9:
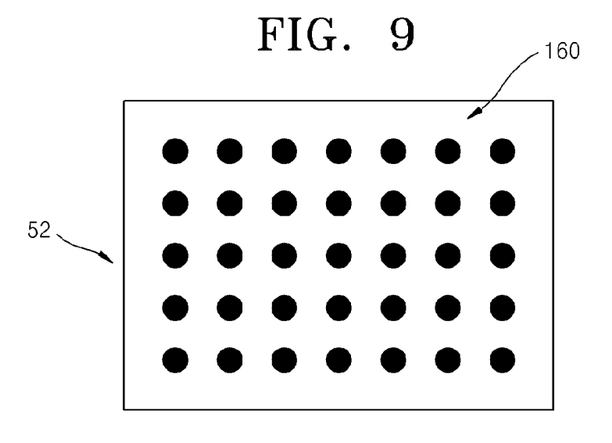
FIGS. 9 through 11 are examples of schematic diagrams for explaining acquiring astigmatism information or astigmatism correction information in the digital photographing apparatus of FIG. 4.
Figure 10A:
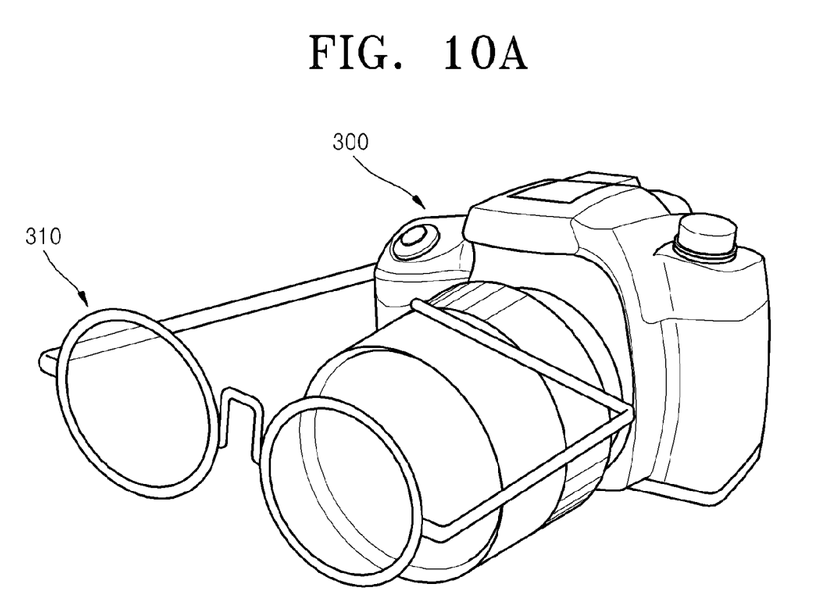
Figure 10B:
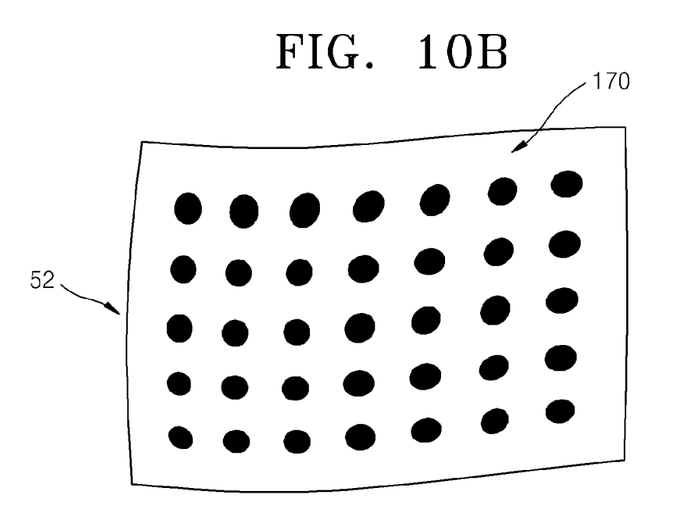
Figure 11:
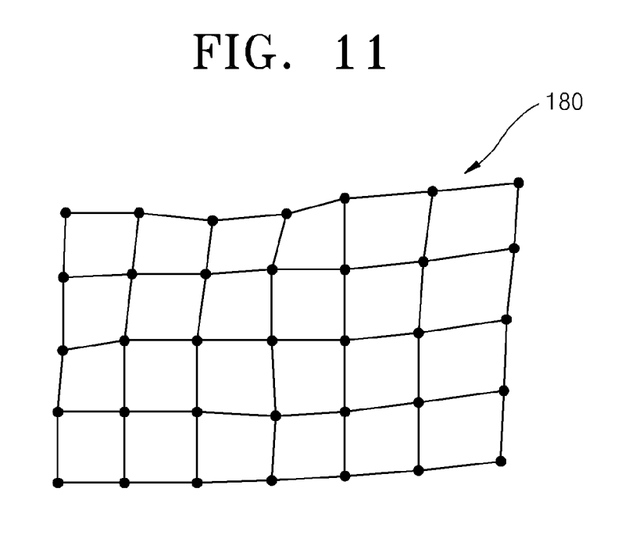

The astigmatism information or the astigmatism correction information stored in the information storage unit may be acquired in various methods, rather than being input by the user. For example, the astigmatism information or the astigmatism correction information may be acquired based on a difference between first and second images that are shot using the digital photographing apparatus, respectively, with and without a pair of user's glasses positioned in front of the lens of the digital photographing apparatus, and may then be stored in the information storage unit. For example, a second image 160 as illustrated in FIG. 9 is acquired when an object with regularly arranged dots, as illustrated in FIG. 9, is shot without a pair of user's glasses positioned in front of the lens of the digital photographing apparatus 300. A first image distorted 170 as illustrated in FIG. 10B is acquired when the same object as illustrated in FIG. 9 is shot with a pair of user's glasses 310, which has an anastigmatic function, being positioned in front of the lens of the digital photographing apparatus 300, as illustrated in FIG. 10A. Data on a degree of distortion of an image that is caused by the user's glasses having the anastigmatic function may be calculated, as illustrated in FIG. 11, by comparing the first image and the second image to yield astigmatism information 180. Then, the user's astigmatism information or astigmatism correction information may be calculated based on the data on the degree of distortion and stored in the information storage unit.

Figure 12:
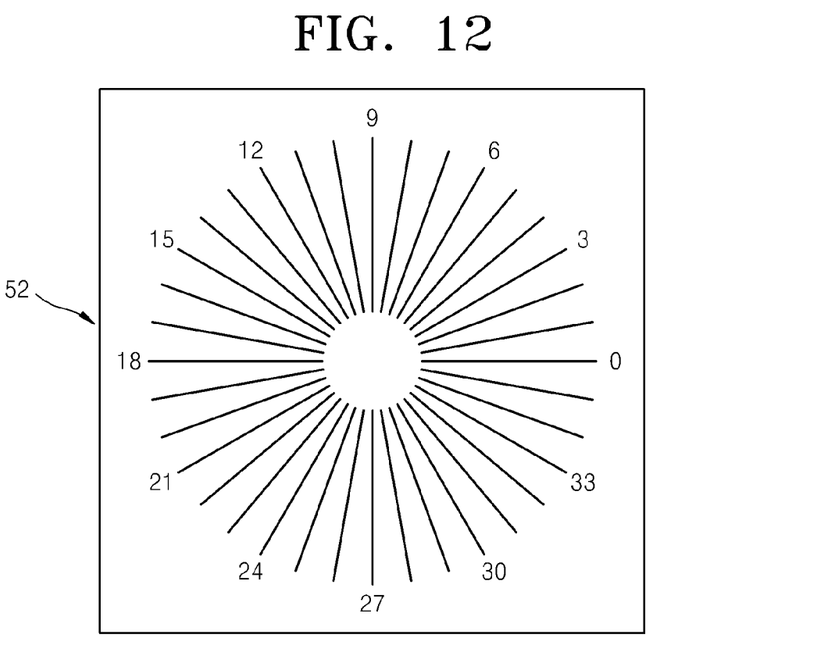
FIG. 12 illustrates an example of an eyesight test chart for explaining acquiring astigmatism information or astigmatism correction information in the digital photographing apparatus of FIG. 4.

The user's astigmatism information or astigmatism correction information may be acquired in various methods, for example, by displaying an eyesight test chart 190, as illustrated in FIG. 12, on the electronic view finder 52 or the display unit 80 of the digital photographing apparatus 300, and may then be stored in the information storage unit.

Additionally, the user's astigmatism information or astigmatism correction information may be acquired by displaying an image on the electronic viewfinder 52 and varying the distortion of the image until the user reports that the image is perceived as being not distorted. The digital photographing apparatus may configured to automatically distort the image and wait for a signal from the user or the user could control the distortion using an user interface presented to the user by the digital photographing apparatus. An standard image such as the eyesight test chart illustrated in FIG. 12 may be used. The eyesight test chart may be pre-loaded in the digital photographing apparatus 300.

Hereinafter, a method of controlling a digital photographing apparatus 300 including an electronic viewfinder 52 as described above, according to an embodiment, will be described. In the method of controlling a digital photographing apparatus 300 according to the present embodiment, the digital photographing apparatus 300 is controlled to distort a preview image and the electronic viewfinder 52 is controlled to display the distorted preview image corresponding to the preview image data generated by the image capture device. As a result, the user with astigmatism may perceive the distorted preview image as being undistorted, because the user with astigmatism distorts the preview image. In other words, the digital photographing apparatus 300 is controlled to distort a preview image corresponding to the preview image data generated by the image capture device in a way opposite to the way in which the user with astigmatism distorts the original preview image, and to display the distorted preview image. The digital photographing apparatus 300 may be controlled to distort and to display a preview image corresponding to the preview image data generated by the image capture device according to a predetermined method. The predetermined method may involve using the astigmatism information or the astigmatism correction information stored in the information storage unit. The astigmatism information or the astigmatism correction information stored in the information storage unit may be previously input by the user. Alternatively, the astigmatism information or the astigmatism correction information may be acquired based on a difference between first and second images that are shot using the digital photographing apparatus, respectively, with and without a pair of user's glasses positioned in front of the lens of the digital photographing apparatus, and may then be stored in the information storage unit. In addition, the digital photographing apparatus may distort a preview image corresponding to the preview image data generated by the image capture device in consideration of whether the digital photographing apparatus is rotated or not, which is sensed by the rotation sensor, and may then be controlled to display the distorted preview image. This is as described above with reference to FIGS. 7 and 8.

Figure 13:
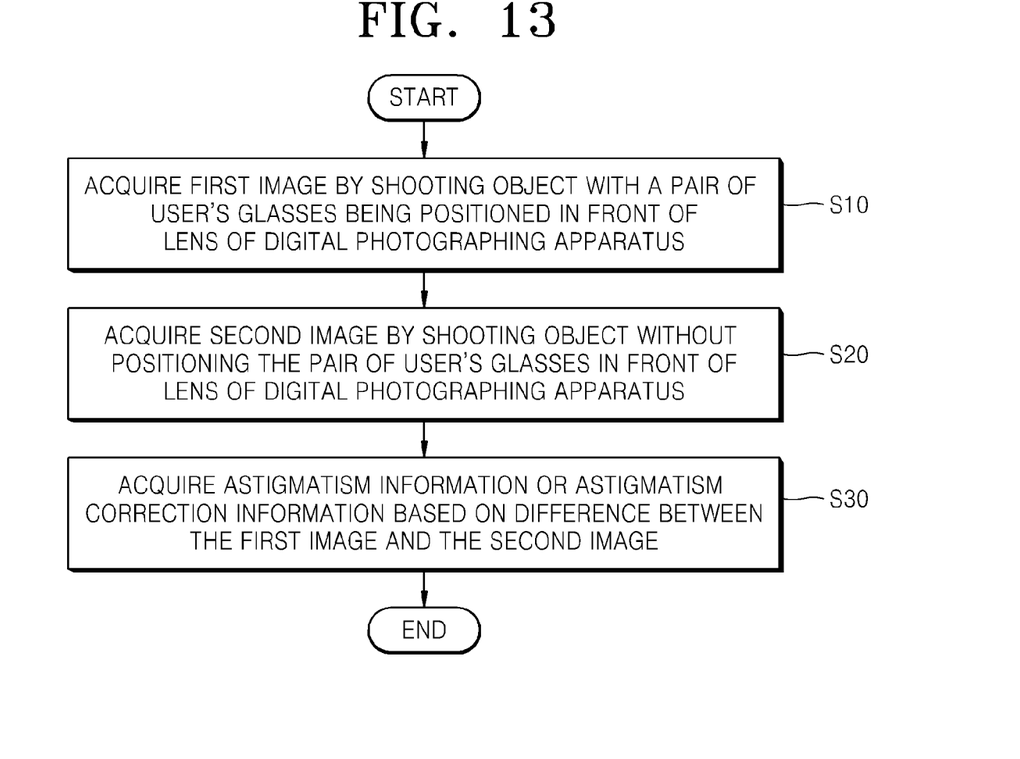
FIG. 13 is a flowchart illustrating an example of a method of controlling a digital photographing apparatus according to another embodiment of the present invention.

FIG. 13 is a schematic flowchart illustrating a method of controlling a digital photographing apparatus including an electronic viewfinder, which displays an image corresponding to image data generated by an image capture device, according to another embodiment.

Referring to FIG. 13, the method may involve acquiring a first image by shooting an object with a pair of anastigmatic glasses 310 of a user with astigmatism being positioned in front of a lens of the digital photographing apparatus 300 (operation S10), acquiring a second image by shooting the object without positioning the pair of anastigmatic glasses 310 of the user in front of the lens of the digital photographing apparatus 300 (operation S20), and acquiring astigmatism information or astigmatism correction information based on a difference between the first image and the second image (operation S30). The order of operation S10 and operations S20 may be switched. Through the operations described above, the astigmatism information or astigmatism correction information of the pair of anastigmatic glasses of the user may be acquired. This is as described above with reference to FIGS. 9 through 11. In the method of controlling the digital photographing apparatus 300 according to the present embodiment, when a preview image corresponding to the preview image data generated by the image capture device is displayed, the digital photographing apparatus distorts the preview image corresponding to the preview image data generated by the image capture device based on the astigmatism information or astigmatism correction information and then controls the electronic viewfinder to display the distorted preview image. As a result, the user with astigmatism may perceive the distorted preview image as not being distorted, because the user with astigmatism distorts the preview image in an opposite way.

As described above, in a digital photographing apparatus 300 and a method of controlling the digital photographing apparatus 300 according to the present invention, a user with astigmatism may accurately perceive the shape of an object on a preview image when using an electronic viewfinder of the digital photographing apparatus.

The various illustrative units, logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A digital photographing apparatus comprising:
an image capture device configured to generate data from light incident to an object to generate preview images of the object;
an electronic viewfinder configured to display preview images; and an information storage unit that stores vision information of a user,
wherein the digital photographing apparatus is configured to capture a first image without a pair of corrective glasses of the user and a second image through the pair of corrective glasses of the user, to calculate corrective information for the user based on the difference between the first image and the second image, to distort the preview image to correct for the vision of the user based on the vision information of the user, and to control the electronic viewfinder to display the distorted preview image.

2. The digital photographing apparatus of claim 1, wherein the digital photographing apparatus distorts the preview image in a preset manner according to the vision of the user.

3. The digital photographing apparatus of claim 1, wherein the vision information of the user is at least one of: astigmatism information or astigmatism correction information.

4. The digital photographing apparatus of claim 1, wherein the digital photographing apparatus is configured to present an interface to the user and receive from the user at least one of: astigmatism information or astigmatism correction information.

5. The digital photographing apparatus of claim 1, wherein the digital photographing apparatus is further configured to distort the preview image in a way opposite to the way in which a user with astigmatism perceives an image as being distorted.

6. The digital photographing apparatus of claim 1, further comprising a rotation sensor configured to sense a rotation of the digital photographing apparatus and generate signals indicating the rotation; and
wherein the digital photographing apparatus is further configured to distort the preview image in consideration of whether the digital photographing apparatus is rotated or not based on the signals generated by the rotation sensor.

7. A method of controlling a digital photographing apparatus, comprising:
displaying a standard image;
responsive to user input to distort the standard image, distorting the standard image and displaying the distorted standard image;
calculating corrective information for the user based on a difference between the standard image and the distorted standard image;
storing the corrective information;
retrieving the correction information for the vision of the user;
generating a preview image from light incident to an object;
distorting the preview image to correct for the vision of a user based on correction information for the vision of the user; and
displaying the distorted preview image to the user.

8. The method of claim 7, wherein the correction information includes at least one of: astigmatism information of the vision of the user or astigmatism correction information of the vision of the user.

9. The method of claim 7, further comprising:
capturing a first image;
capturing a second image with the user's corrective glasses positioned in front of a lens of the digital photographing apparatus;
calculating corrective information for the user based on a difference between the first image and the second image; and
storing the corrective information.

10. The method of claim 7, wherein distorting further comprises:
distorting the preview image using the correction information to correct for the vision of a user in a way opposite to the way in which a user with astigmatism perceives an image as being distorted.

11. The method of claim 7, further comprising:
distorting the preview image to correct for the vision of a user and distorting the preview image based on rotational sensor information, the rotational sensor information indicating whether the digital photographing apparatus is rotated or not.

12. A method of controlling a digital photographing apparatus including an electronic viewfinder that displays an image corresponding to data generated by an image capture device, the method comprising:

(a) acquiring a first image by shooting an object with a pair of user's glasses being positioned in front of a lens of the digital photographing apparatus;

(b) acquiring a second image by shooting the object without positioning the pair of user's glasses in front of the lens of the digital photographing apparatus; and (c) acquiring at least one of astigmatism information or astigmatism correction information based on a difference between the first image and the second image.

13. The method of claim 12, wherein, when a preview image corresponding to preview image data generated by the image capture device is displayed, the electronic viewfinder distorts the preview image corresponding to the preview image data generated by the image capture device, based on the astigmatism information or astigmatism correction information acquired in the act of (c), and displays the distorted preview image.

* * * * *